(12) United States Patent
Crafts et al.

(10) Patent No.: US 6,606,425 B1
(45) Date of Patent: Aug. 12, 2003

(54) TRANSFER MOLDED PACKAGES WITH EMBEDDED THERMAL INSULATION

(75) Inventors: Douglas E. Crafts, San Jose, CA (US);
Kenzo Ishida, Saratoga, CA (US);
David J. Chapman, San Jose, CA (US); Duane Cook, San Jose, CA (US);
James F. Farrell, San Jose, CA (US);
Suresh Ramalingam, Fremont, CA (US); Steven M. Swain, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/100,277

(22) Filed: Mar. 18, 2002

(51) Int. Cl.[7] ................................................. G02B 6/12
(52) U.S. Cl. ...................... 385/14; 385/129; 385/130; 385/37; 385/92; 385/94
(58) Field of Search ............................ 385/14, 24, 37, 385/31, 42, 92, 94, 129, 130, 131, 132

(56) References Cited

U.S. PATENT DOCUMENTS 6,374,014 B1 * 4/2002 Jablonski ..................... 385/37
6,486,440 B1 * 11/2002 Crafts et al. ................ 219/209

OTHER PUBLICATIONS

Ray Erikson, "Foams on the Cutting Edge", Mechanical Engineering Magazine, Jan. 1999.

* cited by examiner

*Primary Examiner*—Brian Healy
(74) *Attorney, Agent, or Firm*—Allen, Dyer, Doppelt, Milbrath & Gilchrist, P.A.

(57) ABSTRACT

An optical component package, in which a transfer molded layer of material (e.g., syntactic foam in one embodiment) is formed at least partially around, or entirely around, the optical component to provide structural and thermal insulation around the component. The optical component may be a planar lightwave circuit (PLC), with a protective passivation layer formed between the PLC and the layer of syntactic foam, to de-couple stresses and thermal transfer between the PLC and the layer of syntactic foam. Strengthening caps, fiber assemblies, and a heater may be provided with the PLC assembly, around which the layer of syntactic foam can also be formed. The protective passivation layer can also be formed between these structures and the syntactic foam; in one embodiment between at least two strengthening caps formed on opposing edges of the PLC. The disclosed package provides numerous structural, thermal and size benefits.

13 Claims, 4 Drawing Sheets

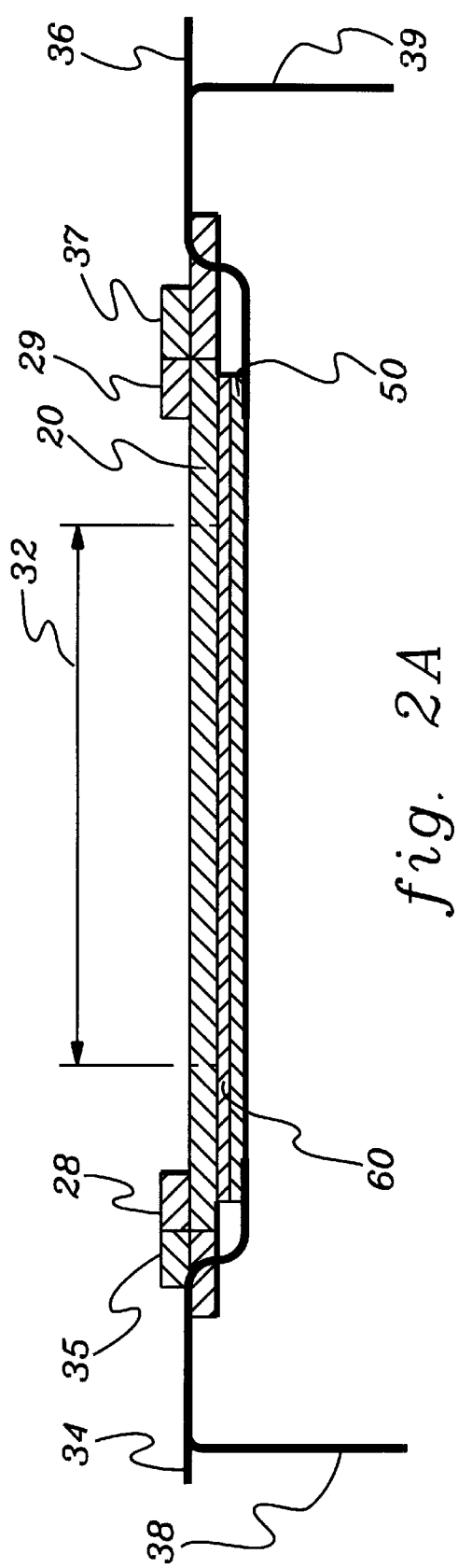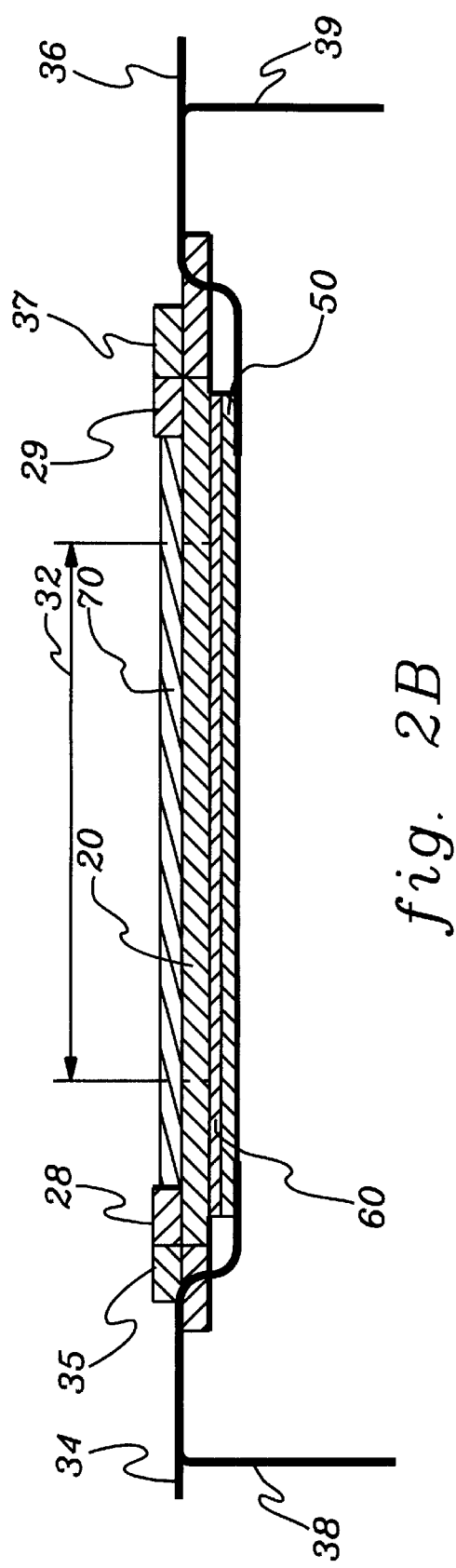

TRANSFER MOLDED PACKAGES WITH EMBEDDED THERMAL INSULATION

CROSS-REFERENCE TO RELATED APPLICATIONS

This Application relates to the following copending, commonly assigned U.S Patent Applications, each of which is incorporated by reference herein in its entirety:

Ser. No. 09/901,474, now U.S Pat. No. 6,486,445, entitled "Redundant Package for Optical Components" filed Jul. 9, 2001;

Ser. No. 09/977,065, pending, entitled "Waveguide Stress Engineering and Compatible Passivation in Planar Lightwave Circuits" filed Oct. 12, 2001;

Ser. No. 10/010,931, pending, entitled "High Thermal Efficiency, Small Form-Factor Packages Including Thermally Insulative Cavities, and Transfer Molded Variants" filed Nov. 20, 2001;

Ser. No. 10/001,266, pending, entitled "Precision Fiber Optic Alignment and Attachment Apparatus" filed Nov. 30, 2001;

Ser. No. 10/077,581, pending, entitled "Compact, Low Insertion Loss, High Yield Arrayed Waveguide Grating" filed Feb. 15, 2002; and Ser. No. 10/099,565, pending, entitled "Multi-Band Arrayed Waveguide Grating With Improved Insertion Loss and Wavelength Accuracy" filed Mar. 15, 2002.

FIELD OF THE INVENTION

The present invention relates to component packaging. More particularly, the present invention relates to a thermally insulative, hermetic or non-hermetic package for isolating optical components (e.g., arrayed waveguide gratings) from external stresses.

BACKGROUND OF THE INVENTION

Fiber optic communication links have been conventionally employed in long-haul, point-to-point networks with controlled environments at all interface points. Such highly controlled, "central office" surroundings usually offer relatively benign operating environments (temperature, humidity, mechanical) for components. Consequently, highly functional components could be developed and installed without considering the impact of other, more extreme environments.

Recent technological advances, coupled with increasing bandwidth demand, are rapidly expanding the use of fiber optic components beyond the "central office" and into potentially harsher environments. For example, dense wavelength division multiplexing (DWDM) enables the transmission of multiple, independent wavelength streams across a single fiber. Predictably, this capability has resulted in the requirement to add or drop these optical channels along the previously untapped long lengths of fiber (and outside of the central office environment) to provide access to the individual wavelength streams. Optical add/drop multiplexers (OADMs) are employed for this function, enabled by arrayed waveguide grating (AWG) components for filtering and forwarding individual wavelengths.

In addition to these technological advances, simple market forces are pushing fiber networks beyond central offices and into the diverse terrain of "metro" markets. This ever-increasing need for fiber bandwidth is resulting in the widespread deployment of fiber networks, and their associated components, into the harsher, less environmentally controlled conditions present in the metro market.

The demands placed on component designers now reach far beyond optical performance, and into the realms of thermal and mechanical insulation. Certain qualification standards (e.g., Telcordia) exist for reliability of optical components, and many customers require qualification under these standards. AWGs however are thin, fragile chips with narrow waveguides produced using planar lightwave circuit (PLC) processing techniques. The various processing tolerances required to meet the requisite optical specifications are already very tight, and in fact get tighter as the need to process more and closer channels increases.

There is also a need to maintain the tightly controlled, internal operating environment (e.g., temperature) for proper optical component operation in a package. The optical performance of PLC waveguides is especially sensitive to temperature. These components usually include active heating elements in closed loop feedback configurations to ensure temperature stability. It is therefore important to thermally insulate the package to ensure the PLC is kept at stable temperature by the heating element.

Environmentally secure packages therefore now play a vital role in the widespread commercialization of these devices. Without adequate packaging, components such as AWGs, with their highly unique and useful functions, would be relegated to laboratory environments only. It is difficult and costly to impose yet additional requirements on the chip process in the form of advanced materials, processing techniques, etc. to satisfy the harsher environmental standards discussed above.

What is required, therefore, are advanced packaging techniques to enable the widespread use of otherwise fragile optical components in diverse and often stressful environments, and which also maintain the internal operating temperature of these optical components to ensure their proper optical performance.

SUMMARY OF THE INVENTION

These requirements are met, and further advantages are provided, by the present invention which in one aspect is an optical component packaging technique, including the package itself, and its method of fabrication. According to the present invention, a transfer molded layer of material (e.g., syntactic foam in one embodiment) is formed at least partially around, or entirely around, the optical component to provide structural and thermal insulation around the component.

In one disclosed embodiment, the optical component comprises a planar lightwave circuit (PLC), with a protective passivation layer formed between the PLC and the layer of syntactic foam, to de-couple stresses and thermal transfer between the PLC and the layer of syntactic foam.

Strengthening caps, fiber assemblies, and a heater, may be provided with the PLC assembly, around which the layer of syntactic foam can also be formed. The protective passivation layer can also be formed between theses structures and the layer of syntactic foam; in one embodiment between at least two strengthening caps formed on opposing edges of the PLC.

The layer of syntactic foam can be formed around portions of, or entirely around, the PLC assembly, but allowing for the passage of fiber optics and/or control leads from the assembly.

In another aspect of the invention, at least one buffer structure encloses a first insulative cavity against a temperature-sensitive portion of the PLC, and separates the syntactic foam from this temperature sensitive portion. The buffer structure has a generally planar section with a frame projecting from its perimeter toward the component to form the cavity against the component.

The encompassing syntactic foam of the present invention structurally and thermally insulates the temperature-sensitive portions of the PLC from the outside ambient environment, and can be formed to be hermetic if required. The thermal isolation also reduces the power consumption required to maintain tight temperature control of the device and reduces thermally induced mechanical stresses which could negatively affect the device performance or reliability. A very small form-factor package is also possible using this approach.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may be best understood by reference to the following detailed description of the preferred embodiment(s) and the accompanying drawings in which:

FIG. 2a is a side, cross-sectional view of the partially completed PLC assembly of FIG. 1;

FIG. 2b is a side, cross-sectional view of the assembly of FIG. 2a with an additional passivation coating, in accordance with the present invention;

BEST MODE FOR CARRYING OUT THE INVENTION

Figure 1:
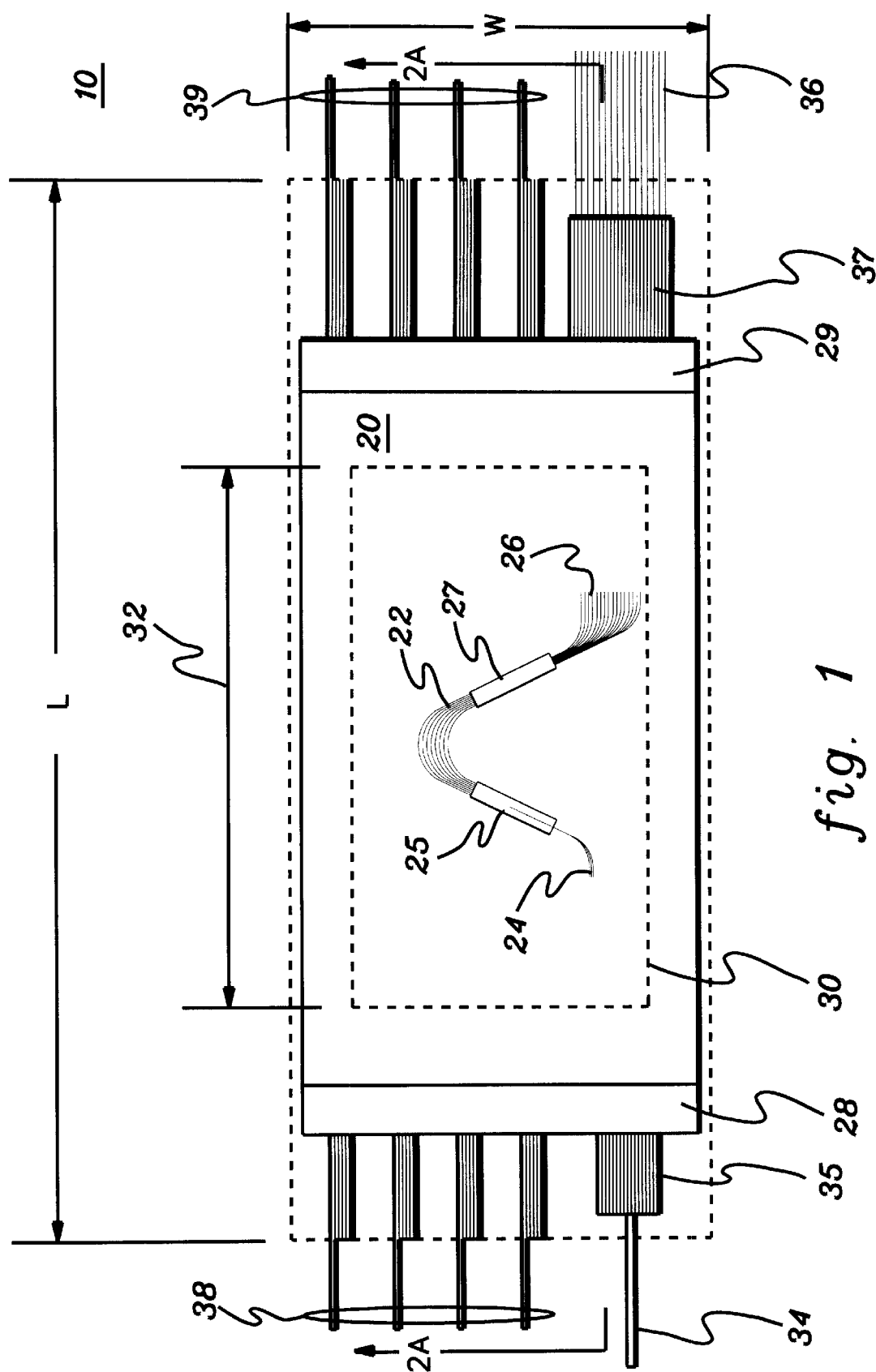
FIG. 1 is a top plan view of an exposed, partially completed planar lightwave circuit (PLC) assembly.

With reference to FIG. 1, an exemplary planar lightwave circuit (PLC) assembly 10 is shown having an arrayed waveguide grating (AWG) formed over a PLC substrate 20 (e.g., silicon). As known to those in the art, an AWG employs an array of waveguides 22 having carefully controlled, differing path lengths which cause constructive phase interference patterns on the optical signals transmitted therein. This technique is useful for multiplexing or demultiplexing optical signals passed from the array input/focusing region 24/25 to the array output/focusing region 26/27. The waveguides are formed, e.g., using silica-on-silicon, wafer-based processing, etching and deposition techniques.

In the exemplary demultiplexing application shown, input fiber optic 34 is interfaced to substrate 20 using a glass or silicon v-groove block assembly 35. Multiple out put fibers 36 are also interfaced to the substrate 20 using a similar block assembly 37. V-groove assemblies can be implemented using techniques known to those skilled in the art; and improved accuracy can be obtained using the techniques of the above-incorporated U.S. Patent Application entitled "Precision Fiber Optic Alignment and Attachment Apparatus."

The substrate is mounted over a heating element (not visible), which is connected to control lead groups 38 and 39. These control leads enable active, external monitoring of the temperature at various points in the package (using, e.g., thermistors mounted in the package and connected to the leads), and also enable active control of the heating element to keep substrate 20 at a fixed temperature (e.g., to within 0.1 degree Celsius), according to, e.g., an external feedback circuit.

The tight spatial and thermal tolerances necessary for proper operation of the AWG, as discussed above, lead to the requirements for effective packaging and sealing for use in adverse environmental conditions. Moreover, because of the tight thermal tolerances necessary for proper waveguide operation, as maintained by the heating element, the package must also provide a high degree of thermal insulation around certain areas. For example, area 30 on substrate 20 (noted by a dashed line) is one area requiring a high degree of thermal insulation, since that area includes waveguide area 22 and focusing regions 25 and 27. For clarity with respect to the side views discussed below, lateral dimension 32 is also used to designate this area in the cross-sectional views below.

With reference now to the side, cross-sectional view of FIG. 2a, a planar heating element or heater 50 is now visible under substrate 20. The heater is formed from, e.g., aluminum nitride. The heater is used to ensure that substrate 20 is maintained at a constant temperature (very uniformly across its surface), since temperature changes will cause minor structural changes in AWG signal paths, and negatively impact its optical performance. Substrate 20 is mounted onto heater 50 using, for example, a thin layer of low modulus silicon material 60. Aluminum nitride is chosen for heater 50 since its coefficient of thermal expansion (CTE) is approximately matched to that of the silicon substrate, thus preventing any adverse thermo-mechanical stress at this interface. Other materials with similar thermal conductivities combined with Si-matched CTEs would serve similar function. These materials may include Si Carbide or Si. Such materials in general are highly thermally conductive, providing high uniformity of temperature across the heater, and therefore across the temperature sensitive area 32 of the substrate 20.

Pyrex caps 28 and 29 are placed near the edges of the substrate to facilitate polishing of the substrate edges (and waveguides) to provide a larger, smooth surface to adhere to the v-groove block assemblies 35, 37.

In accordance with the present invention, an encompassing, transfer-molded layer of epoxy or epoxy-type material is used as the outer package for the PLC assembly. The composition and formation of this layer are discussed further below. Regardless of the type of material used, it may be desirable to further protect the sensitive area 32 of PLC 20 with an additional layer. In accordance with the present invention, and with reference to FIG. 2b, a low modulus passivation layer 70 is deposited on the PLC surface, to de-couple stresses and thermal transfer between the PLC and the transfer molded material.

This layer can be integrated in the PLC itself during PLC formation, as discussed in the above-incorporated U.S. Patent Application entitled "Waveguide Stress Engineering and Compatible Passivation in Planar Lightwave Circuits," and/or can also be implemented as another layer over the finished PLC substrate as in FIG. 2b, formed between caps 28 and 29. Possible materials for this layer include a compliant, low modulus foam-filled elastomer, air-filled polyimide, etc. Application techniques include deposition, spinning, dipping, etc. Structural compliance of layer 70 is necessary to allow for the slight thermal expansions and contractions which will occur as the temperature of the PLC 20 is changed by heater 50. Moreover, this material should be capable of withstanding the high molding pressures and stresses due to material shrinkage upon solidifying during the molding process, especially near the PLC's sensitive area 32.

Though this passivation layer is shown on the upper surface of PLC 20, other exposed areas of the PLC assembly (e.g., over pyrex caps 28 and 29; around V-groove assemblies 35 and 37; around the exposed edges and bottom of substrate 20; and/or around heater 50) can also be treated with this passivation prior to the application of the outer, transfer molded material, discussed below.

Figure 3:
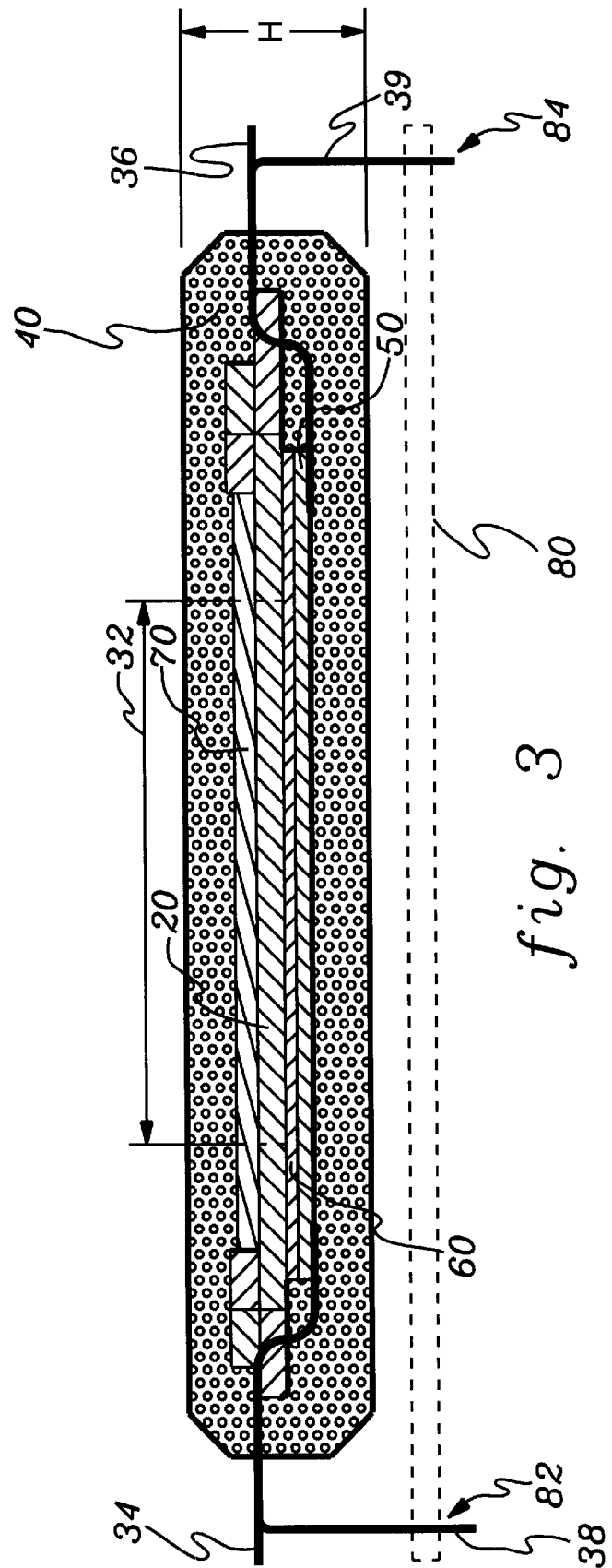
FIG. 3 is a side, cross-sectional view of a completed, transfer-molded PLC package, in accordance with the present invention.

In accordance with the present invention, and with reference to FIG. 3, an encompassing layer of transfer-molded material 40 is formed around the entire assembly of FIG. 2b. Injection molding techniques (e.g., reaction injection molding) are known to those skilled in the art, and involve the preparation of a cavity mold which determines the final, outer profile of the material, and then pressing heated material around the internal package components using the mold. Injection molding the package avoids some of the manual assembly necessary for the shell packages.

The material used can be, for example, silica-filled or glass-filled epoxy. In one embodiment, the material can be a syntactic foam, which includes separately manufactured bubbles or microballoons that are mechanically combined with a resin to form a composite material, as described in the article entitled "Foams on the Cutting Edge," Mechanical Engineering, January, 1999. These microballoons, also referred to as microspheres, may measure between 1–1000 micrometers in diameter, but are typically in the 10–300 micrometer range, in one embodiment 25 micrometers. They should preferably be evenly distributed throughout the resin.

Input 34 and output 36 fibers are also shown in this view, along with a possible user mounting board 80. This board may have through-holes in areas 82 and 84, through which control leads 38 and 39 can be placed, and permanently soldered. In this manner, the entire package is rigidly suspended over board 80 using rigid leads 38 and 39; while allowing the fragile fibers 34 and 36 to be handled independently.

As discussed in the above-incorporated U.S. Patent Application entitled "High Thermal Efficiency, Small Form-Factor Packages Including Thermally Insulative Cavities, and Transfer Molded Variants" the thermal environment around a thermally-sensitive PLC must be maintained. Thermal cavities were disclosed in that application for an extra layer of thermal insulation, created (and maintained during the molding process) by structural "buffers" above and/or below the sensitive portions of the PLC. The syntactic foam approach of the present invention can be used instead of, or in addition to, the buffered cavity approach.

Figure 4:
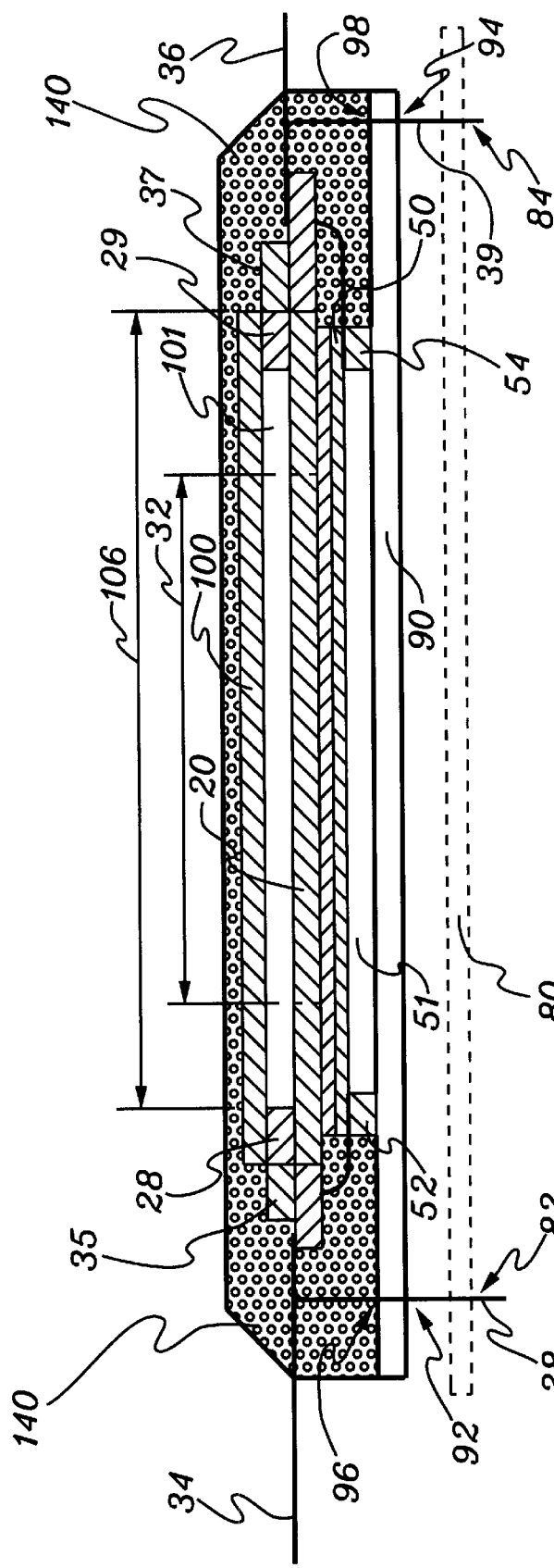
FIG. 4 is a side, cross-sectional view of another, completed transfer-molded PLC package, in accordance with another aspect of the present invention.

For example, and with reference to FIG. 4, a buffered embodiment of the present invention is depicted in a side, cross-sectional view similar to the views used above. Like numerals are used to denote like elements, such as substrate 20, heater 50, fibers 34, 36, v-groove assemblies 35, 37 and control leads 38, 39. However, in this embodiment, a generally planar package base 90 (e.g., FR5 or glass) is used, and an encompassing, transfer-molded layer of syntactic foam 140 is used. The foam completely covers all exposed surfaces, above the base 90, except the temperature-sensitive areas of the heater and substrate, which are subject to areas of cavity insulation in accordance with the present invention. In one embodiment, the foam can be formed completely around and under the base also (similar to the surrounding layer shown in FIG. 3).

To provide additional thermal insulation (and protect the heater/substrate from the injected material), insulative cavities 51 and 101 are formed in this embodiment, and may be rigid components, rigidly attached to the PLC, and capable of withstanding the high molding pressures and stresses due to material shrinkage upon solidifying during the molding process.

For example, frame sections 52 and 54 are shown separating heater 50 from base 90 (e.g., FR5 or glass), forming insulative cavity 51. This frame could be a separate structure epoxied into place, an integral part of the base and/or heater, or alternatively an epoxy bond line deposited about the perimeter of the base and/or heater 90. Upon assembly of the base and heater, insulative cavity 51 is formed.

Similarly, pyrex caps 28 and 29 can also be employed as a frame to form cavity 101. In the embodiments above, these sections serve as strengthening "pyrex caps" placed near the edges of the substrates to facilitate polishing of the substrate edges (and waveguides) to provide a large, smooth surface to adhere the V-groove fiber assemblies 35, 37. This frame could also be formed from, e.g., an epoxy bond line deposited about the perimeter of the substrate. Here an additional cap or lid 100 (e.g., glass) is adhered to the frame, forming insulative cavity 101. This cavity has a breadth 106 sufficient to encompass the temperature-sensitive area 32 of substrate 20.

Though the buffers here are formed from the frame sections 52/54 with base 90; or frame sections 28/29 with lid 100; other buffer structures can be employed without departing from the invention. For example, the separate buffer structures discussed in the above-incorporated Application can be used, as could a diaphragm-like material sufficient to create the cavity during the molding process.

Advantageously, insulative cavities 51 and 101 (possibly 6 micrometers in height or smaller) also protect the sensitive areas of the substrate and heater from the transfer molded epoxy, including molding pressures and shrinkage stresses that occur as a result of the solidification of the molding material during the molding process.

In this embodiment, control leads 38 and 39 are shown passing through "holes" of the package base 90 in areas 92 and 94 respectively. As discussed above, the entire package can then be mounted on a user board 80 at solder points 82 and 84. In an alternate embodiment (not shown), the leads could be formed to provide surface mounting to areas 96 and 98, and surface mount pads could be used at areas 92 and 94 for further device connection.

The terms "cavity" and "insulative cavity" are used broadly herein to connote any type of insulative area enabled by the structure of the buffer. The most convenient material filling cavity 61 is air, but any gaseous insulator can be used, as could a high-air content insulator, or even a vacuum if possible. The term "buffer" is used broadly herein to connote any type of structure that creates the cavities without inducing any adverse contact or stresses on the underlying substrate. Rigid or semi-rigid structures are disclosed herein, but the buffer could also be a diaphragm or similar structure placed during an injection-molding process discussed further below. The buffers may also provide some moisture sealing properties.

The extra levels of cavity insulation are advantageously located about the center of heater 50, in vertical correspondence to the temperature sensitive area 32 of the substrate 20, thereby providing extra insulation in this area.

The isolated airspaces created by the syntactic foam (including the microspheres) and/or insulative cavities of the present invention thermally insulate the temperature-sensitive portions of the PLC from the outside ambient environment. The thermal isolation also reduces the power consumption required to maintain tight temperature control of the device and reduces thermally induced mechanical stresses which could negatively affect the device performance or reliability. These parameters are important to the commercial viability of the device.

If needed, redundant package techniques can also be used in accordance with the above-incorporated U.S. Patent Application entitled "Redundant Package for Optical Components" to improve the thermal insulation and protection from external environmental factors.

The principles of the present invention extend to any AWG architectures and methods for their fabrication, including those disclosed in the above-incorporated U.S. Patent Applications entitled "Compact, Low Insertion Loss, High Yield Arrayed Waveguide Grating" and "Multi-Band Arrayed Waveguide Grating With Improved Insertion Loss and Wavelength Accuracy." The unique, compact AWGs disclosed in those Applications have features such as:

- Optimal widths and spacing of waveguides (especially the array and output waveguides) along the planar waveguide region facets, which are largely determinative of AWG size and optical performance;
- Optimal waveguide cross-section (e.g., width and height) for optical performance and alignment to fiber cores;
- Modified index of refraction difference (0.78) between the waveguide core and cladding regions, as an independent variable to ensure proper optical energy confinement and therefore optical performance;
- Optimal array waveguide numbers, lengths, path length differences, and free spectral range for the wavelength bands and band spacings of interest; and
- Multi-band operation with improved roll-off and wavelength accuracy characteristics.

Also particularly applicable to the problems discussed herein are the stress balanced passivation techniques of the above-incorporated U.S. Patent Application entitled "Waveguide Stress Engineering and Compatible Passivation in Planar Lightwave Circuits." Any of the passivation and stress-balancing techniques disclosed in that Application can be used in addition to the principles of the present invention.

The encompassing syntactic foam of the present invention structurally and thermally insulates the temperature-sensitive portions of the PLC from the outside ambient environment. The thermal isolation also reduces the power consumption required to maintain tight temperature control of the device and reduces thermally induced mechanical stresses which could negatively affect the device performance or reliability. A very small form-factor package is also possible using this approach. For example, in FIG. 1, a length (L) can be approximately 85 mm, and width (W) approximately 42 mm. In FIG. 3, height (H) can be approximately 7 mm. These are very small dimensions compared to those realized using present approaches.

While the invention has been particularly shown and described with reference to preferred embodiment(s) thereof, it will be understood by those skilled in the art that various changes in form and details may be made therein without departing from the spirit and scope of the invention.

What is claimed is:

1. A thermally insulative optical component package for an optical component comprising a planar lightwave circuit (PLC), comprising:
   a molded layer of syntactic foam formed at least partially around the optical component to provide structural and thermal insulation therearound; and
   a protective passivation layer between the PLC and the layer of syntactic foam, formed to de-couple stresses and thermal transfer between the PLC and the layer of syntactic foam.

2. The component package of claim 1, further comprising:
   at least one additional structure affixed to the PLC chosen from the group of: strengthening caps, fiber assemblies, and a heater, around which the layer of syntactic foam is also formed.

3. The component package of claim 2, wherein the protective passivation layer is also formed between the at least one additional structure and the layer of syntactic foam.

4. The component package of claim 1, wherein the protective passivation layer is formed over an upper surface of the PLC, and between at least two strengthening caps formed on opposing edges of the PLC.

5. A thermally insulative optical component package for an optical component comprising a planar lightwave circuit (PLC), comprising:
   a molded layer of syntactic foam formed at least partially around the optical component to provide structural and thermal insulation therearound; and
   at least one buffer structure enclosing a first insulative cavity against a temperature-sensitive portion of the PLC, and separating the syntactic foam from said portion.

6. The component package of claim 5, wherein the at least one buffer structure has a generally planar section with a frame projecting from its perimeter toward the component to form the cavity against the component.

7. A thermally insulative optical component package for an optical component comprising a planar lightwave circuit (PLC), comprising:
   a molded layer of syntactic foam formed at least partially around the optical component to provide structural and thermal insulation therearound;
   wherein the syntactic foam encloses a temperature-sensitive portion of the optical component, comprising at least one optical waveguide formed in the PLC.

8. The component package of claim 7, wherein the PLC comprises an arrayed waveguide grating, within the temperature-sensitive portion of the component.

9. A thermally insulative optical component package, wherein the optical component comprises a planar lightwave circuit (PLC) assembly comprising:
   a heater proximate the PLC to control the temperature of a temperature-sensitive area thereof; and
   at least one fiber assembly affixed to a respective edge of the PLC;
   wherein a layer of transfer molded material is formed entirely around the PLC assembly, but allowing for the passage of fiber optics and/or control leads from the assembly.

10. The component package of claim 9, further comprising:
    a protective passivation layer at least partially between the PLC assembly and the layer of material, formed to de-couple stresses and thermal transfer between the PLC and the layer of syntactic foam.

11. The component package of claim 10, wherein the protective passivation layer is formed over an upper surface of the PLC, and between at least two strengthening caps formed on opposing edges of the PLC.

12. The component package of claim 9, wherein the layer of transfer molded material comprises syntactic foam.

13. The component package of claim 9, wherein the PLC comprises and arrayed waveguide grating having at least one waveguide formed in the temperature sensitive portion thereof.

* * * * *